(12) United States Patent
Koele

(10) Patent No.: US 7,436,309 B2
(45) Date of Patent: Oct. 14, 2008

(54) IDENTIFIABLE PACKAGING

(75) Inventor: Werner Koele, Graz (AT)

(73) Assignee: RF-IT Solutions GmbH, Graz (AT)

( * ) Notice: Subject to any disclaimer, the term of this patent is extended or adjusted under 35 U.S.C. 154(b) by 98 days.

(21) Appl. No.: 11/329,972

(22) Filed: Jan. 10, 2006

(65) Prior Publication Data

US 2006/0187053 A1   Aug. 24, 2006

(30) Foreign Application Priority Data

Jan. 13, 2005   (DE) ................ 10 2005 001 725

(51) Int. Cl.
*G08B 13/14* (2006.01)
(52) U.S. Cl. ............... 340/572.7; 340/572.1; 340/572.8; 343/742
(58) Field of Classification Search ............ 340/572.7, 340/572.8, 572.1; 343/742; 206/807, 459.1; 229/900, 901, 68.1
See application file for complete search history.

(56) References Cited

U.S. PATENT DOCUMENTS

| | | | |
|---|---|---|---|
| 6,069,564 A * | 5/2000 | Hatano et al. ............ 340/572.7 |
| 6,107,920 A | 8/2000 | Eberhardt et al. |
| 6,259,369 B1 * | 7/2001 | Monico .................... 340/572.8 |
| 6,861,993 B2 * | 3/2005 | Waldner .................... 343/742 |
| 7,075,435 B2 * | 7/2006 | Jesser ...................... 340/572.1 |
| 7,075,437 B2 * | 7/2006 | Bridgelall et al. ........ 340/572.1 |
| 2004/0005418 A1 | 1/2004 | Schmid et al. |
| 2004/0105957 A1 | 6/2004 | Puttkammer |

FOREIGN PATENT DOCUMENTS

| | | |
|---|---|---|
| DE | 297 21 803 U1 | 3/1998 |
| DE | 200 09 865 U1 | 1/2001 |
| DE | 100 37 854 A1 | 2/2002 |
| DE | 101 11 847 A1 | 9/2002 |
| DE | 102 29 168 A1 | 1/2004 |

\* cited by examiner

*Primary Examiner*—Davetta W. Goins
(74) *Attorney, Agent, or Firm*—Brinks Hofer Gilson & Lione

(57) ABSTRACT

A packaging body is designed such that plate-shaped products can be stacked therein in a stacking direction. An antenna is fitted to the packaging body. The antenna is in the form of a coil having coil windings. The coil windings are flat along the packaging body. The coil through-opening surface is aligned at an angle of less than 90° with respect to the stacking direction. The coil windings, which surround the opening surface, extend along one or more packaging body surfaces, which run at an angle with respect to the opening surface.

23 Claims, 4 Drawing Sheets

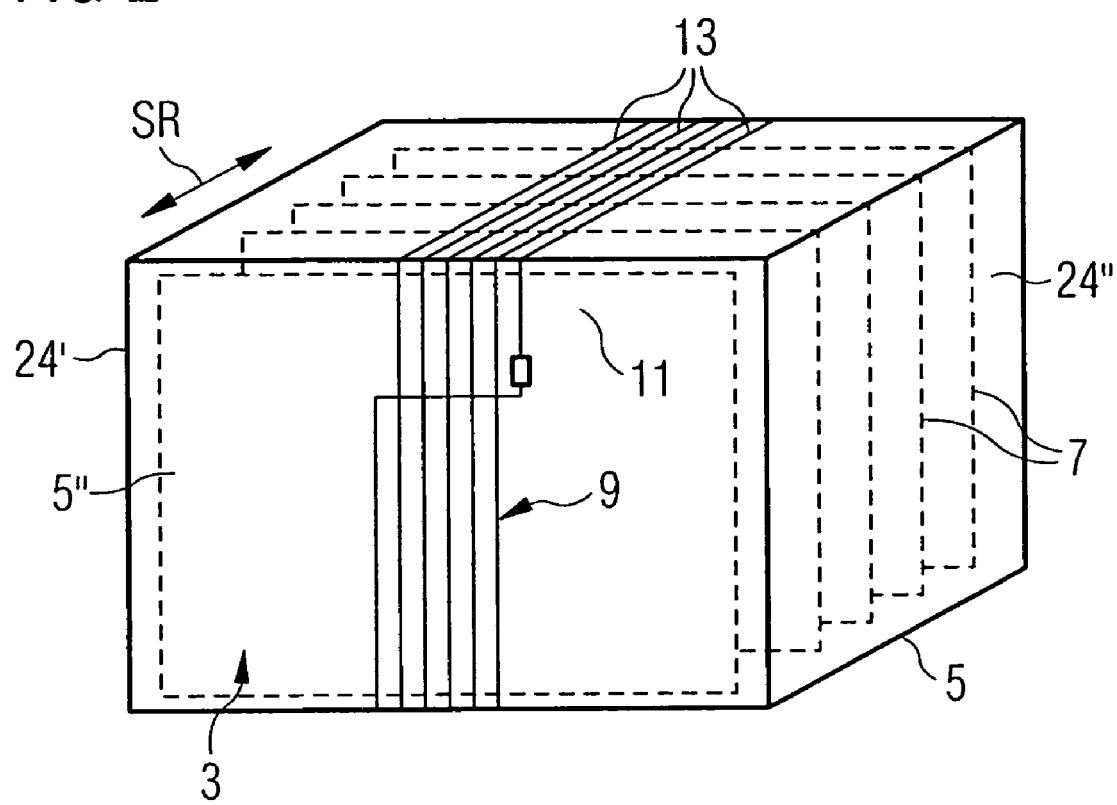

IDENTIFIABLE PACKAGING

PRIORITY CLAIM

This application claims priority to German Patent Application DE 10 2005 001 725.8-27, filed on Jan. 13, 2005, which is incorporated by reference in its entirety.

TECHNICAL FIELD

The present invention relates to identifiable packaging. More particularly, the present invention relates to identifiable packaging, for example for packaging plate-shaped products that have a metal component extending in the plate surface and are arranged in stacked fashion in the packaging, and a combination of such packaging with plate-shaped products inserted therein and to an identification system having a packaging.

BACKGROUND

In transportation and distribution logistics of products, quick identification of the products with a high degree of reliability is desirable to reduce transportation and distribution times without increasing the error quota with the aim of precise delivery. For this purpose, passive or active transponders can be arranged on the products to be identified. These transponders are then excited by corresponding read devices to transmit a code signal specific to the respective product. The transmitted code signal is then detected by the read device and evaluated.

However, for products having metallic components, the products may be identified incorrectly since the operation of the transponder antenna associated with the transponder is negatively influenced by the eddy currents produced by the metal components on the products. This may occur, for example, in pill products which reside in a pallet having a metal layer which is laminated onto a pallet side and can be pressed in. In addition, to ensure reliability in transponder operation, the transponder antenna is relatively large. However, the space for an antenna may be limited on certain smaller packagings, such as those that store tablet products.

Referring to references using known transponder techniques and packaging, DE 297 21 803 U1 discloses packaging having a packaging body in which plate-shaped blister packs are stacked one behind the other in a stacking direction. DE 200 09 865 U1 discloses an antenna arrangement for contactless inductively coupled transponders. In this reference, the antenna arrangement has a complete layer of electrically conductive material into which insulating trenches are introduced so as to form winding-like conductor runs. DE 101 11 847 A1 describes safety features in the form of connections which serve to identify the authenticity of products. The safety features include different components, coding means and electrically conductive layers, which are connected to a carrier substrate in a different arrangement. DE 102 29 168 A1 discloses a laminate in the form of packaging having a carrier layer and an electrically conductive layer, which is formed in one section to give an antenna structure. The antenna structure is connected to a microchip and forms a transponder together with this microchip. However, each of these techniques is relatively slow and/or still engenders reliability issues.

BRIEF DESCRIPTION OF THE DRAWINGS

The present invention is illustrated by way of example and not limited to the accompanying figures in which like references indicate similar elements. Exemplary embodiments will be explained in the following text with reference to the attached drawings, in which:

FIG. 2 shows a perspective view of an identifiable packaging according to the invention in accordance with a second embodiment of the invention.

Skilled artisans appreciate that elements in the figures are illustrated for simplicity and clarity and have not necessarily been drawn to scale.

DETAILED DESCRIPTION

An identifiable packaging having a packaging body is provided. The identifiable packaging is designed such that parallel stacked plate-shaped products can be accommodated therein. The identifiable packaging has a transponder antenna, which is fitted to the packaging body. The transponder antenna transmits energy and identification signals to identify the packaging. The transponder antenna contains a coil having coil windings, which run around a coil through-opening surface and run flat along the packaging body.

Figure 1:
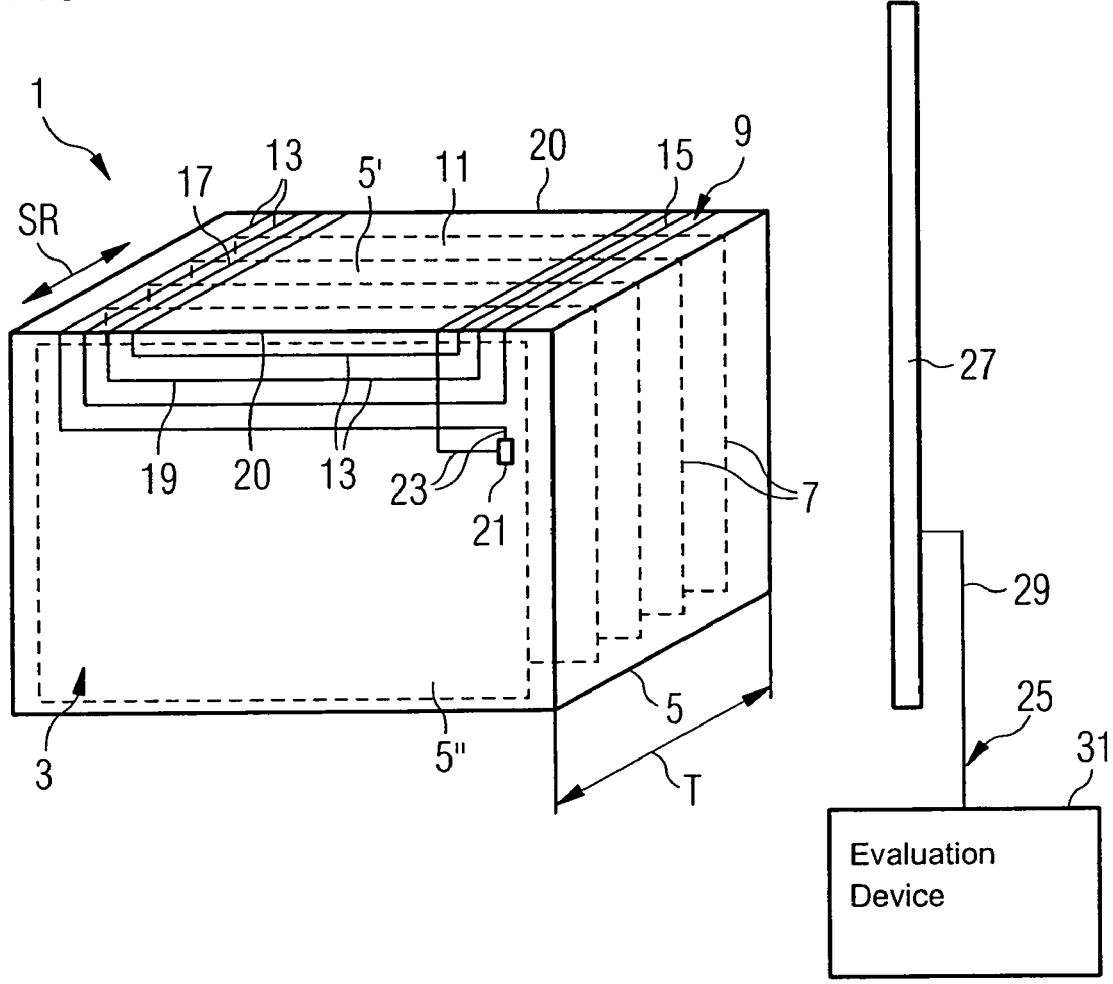
FIG. 1 shows a schematic, perspective view of a first embodiment of an identification system according to the invention having an identifiable packaging according to the invention.

In the identification system 1 illustrated in FIG. 1, an identifiable packaging 3 is provided that has a parallelepipedal packaging body 5. In the packaging body 5, plate-shaped products 7 are inserted such that they are stacked in a stacking direction SR.

The packaging also has a transponder antenna 9, which is a coil having coil windings 13. The coil windings 13 run flat around a coil through-opening surface 11 and run flat on the outside of the packaging body 5. The coil-shaped transponder antenna 9 has a rectangular, annular design. Two coil winding sections 15 and 17, lying opposite one another, run flat on an upper side surface 5' of the packaging body 5. The two remaining, opposing coil winding sections, of which only one coil winding section 19 is shown, run completely on the front side surface 5'' and along the rear side surface of the packaging body 5, namely adjacent to the respective edge 20 between the upper packaging body side surface 5' and the front 5'' or the rear body side surface. Thus, not a single coil winding 13 of the two remaining, opposing coil winding sections 19 runs on the upper surface 5' of the parallelepipedal packaging body 5. As a result, the dimensions of the coil through-opening surface 11 are maximized at the total depth T of the packaging body 5. As shown, the total depth T is the distance between the front surface 5'' and the rear surface of the packaging body 5.

The transponder antenna 9 also has a chip 21. The chip 21 stores a code specific to the packaging 3 in a chip-internal store. The chip 21 is fitted to the packaging body 5 on the outside of its front side surface 5'' and is connected to associated coil windings 13 of the transponder antenna 9 via connecting lines 23.

The identification system 1 also has a read device 25 that is connected to an evaluation device 31 via a data line 29. The read device 25 has a rod-shaped transmission/reception antenna 27. The transmission/reception antenna 27 may also have any other desired suitable antenna shape. The evaluation device 31 contains a computer. Electrical signals generated by the evaluation device 31 are transmitted to the transmission antenna 27 via the data line 29 and transmitted by the transmission antenna 27 as a radiofrequency signal. In the transponder antenna 9, which is permeated by the magnetic field brought about by the electromagnetic field produced by the transmission antenna 27, a current is induced which excites the chip 21 causing it to transmit the code via the transponder antenna 9 in the form of a radiofrequency code signal. The code signal is then received by the reception/transmission antenna 27 and is passed back to the evaluation device 31 via the data line 29. The evaluation device 31 then evaluates the received code signal and can automatically and clearly identify the packaging 5 thereby. Disruptive metallic components in the plate-shaped products, such as film-like covers used in tablet pallets, do not disrupt the operation of the transponder antenna 9 since the pallet surfaces extend parallel to the magnetic flux passing perpendicularly through the coil through-opening surface 11.

An RFID system may be used that is in accordance with ISO/IEC 18000-3 Mode 2. Such a system produces comparatively high field strengths in an RFID read device (3-axis tunnel), which is magnetically shielded from the outside, and which also makes possible, in addition to directionally independent identification, the identification of a large number of objects, which are stacked tightly together, within a short period of time. Overall, the system may operate using an RFID system operated in the 13 MHz range, for example, using a 13.56 MHz system.

As explained above, the coil through-opening surface 11 is expanded to a sufficient extent owing to the front and rear coil winding sections 19. The front and rear coil winding sections 19 are bent back from the upper side surface 5' of the packaging body 5 towards the front 5" and the rear side surface, such that sufficient operation of the transponder antenna 9 is achieved. The packaging body 5 is designed such that the front 5" and the rear surface of the packaging body 5 represent large side surfaces, whereas the upper 5' and the lower surface and the left-hand and right-hand surface (in FIG. 1) of the packaging body are, on the other hand, small side surfaces.

FIG. 2 shows another embodiment of a packaging 3. The packaging illustrated in FIG. 2 likewise has a parallelepipedal packaging body 5 with plate-shaped products 7, such as tablet panels, arranged therein one behind the other in stacked fashion in a stacking direction SR. The packaging 3 also has a transponder antenna 9 having coil windings 13, which are wound approximately centrally around the entire packaging body 5 and thus define a coil through-opening surface 11. The coil through-opening surface 11 is defined by the annular shape of the coil windings 13 and extends parallel to the stacking direction SR and thus perpendicular with respect to the plate surface of the respective plate-shaped product 7.

As no single coil winding 13 is arranged on the side surfaces (the left-hand and right-hand side surfaces 24', 24" in FIG. 2) of the packaging body 5 which are parallel to the coil through-opening surface 11, a coil through-opening surface 11 perpendicular to the plate surfaces is achieved which is as large as possible with regard to the left-hand and right-hand side surfaces 24', 24". As shown in the embodiment in FIG. 1, the front 5" and the rear side surfaces are large side surfaces, whereas the upper 5', the lower, the left-hand 24' and the right-hand 24" side surfaces are smaller than the large side surfaces mentioned.

Identification of the packaging 3 takes place in this embodiment, for example, in a manner similar to that of FIG. 1. That is, a radiofrequency excitation signal is transmitted to the transponder antenna 9 via a read device (not illustrated here). The radiofrequency excitation signal excites a transponder chip 21, which is connected to the transponder antenna 9 and is fitted flat on the front side 5". The transponder chip 21 transmits an identification code stored therein via the transponder antenna 9 which can then be received by the read device and evaluated to identify the packaging 3.

Figure 3A:
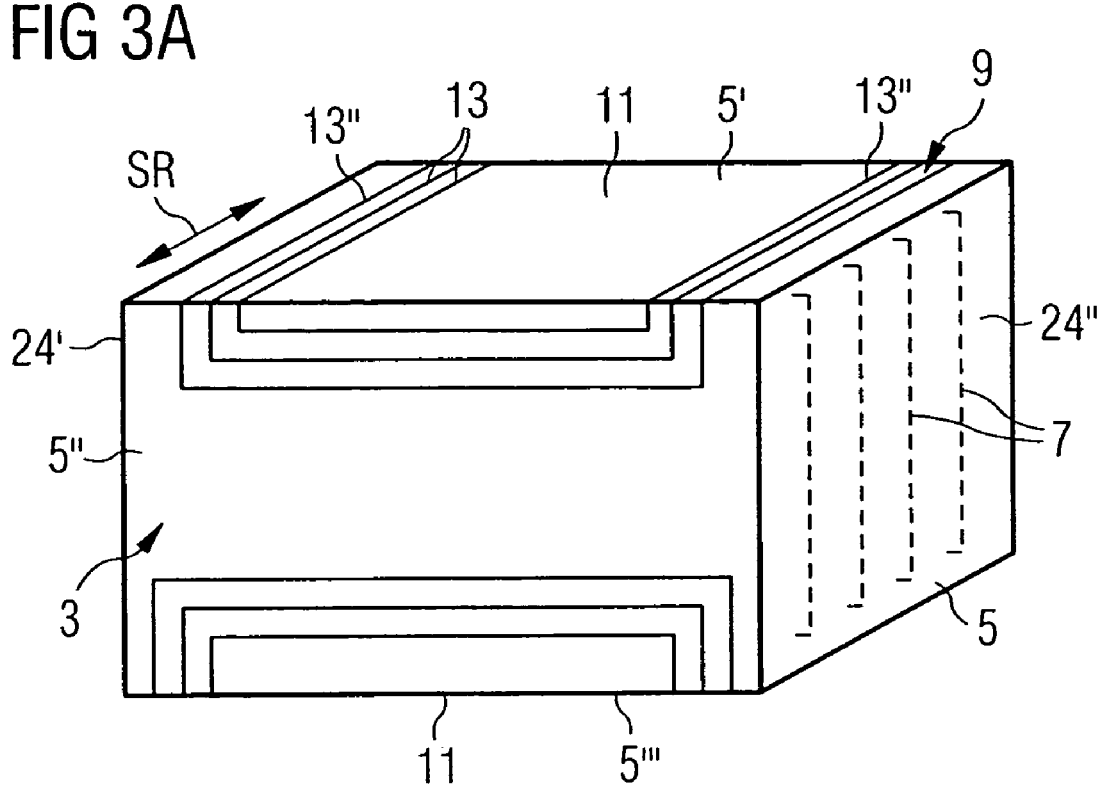
FIGS. 3A and 3B show perspective views, from the front and from the rear, of a packaging according to the invention in accordance with a third embodiment of the invention.
Figure 3B:
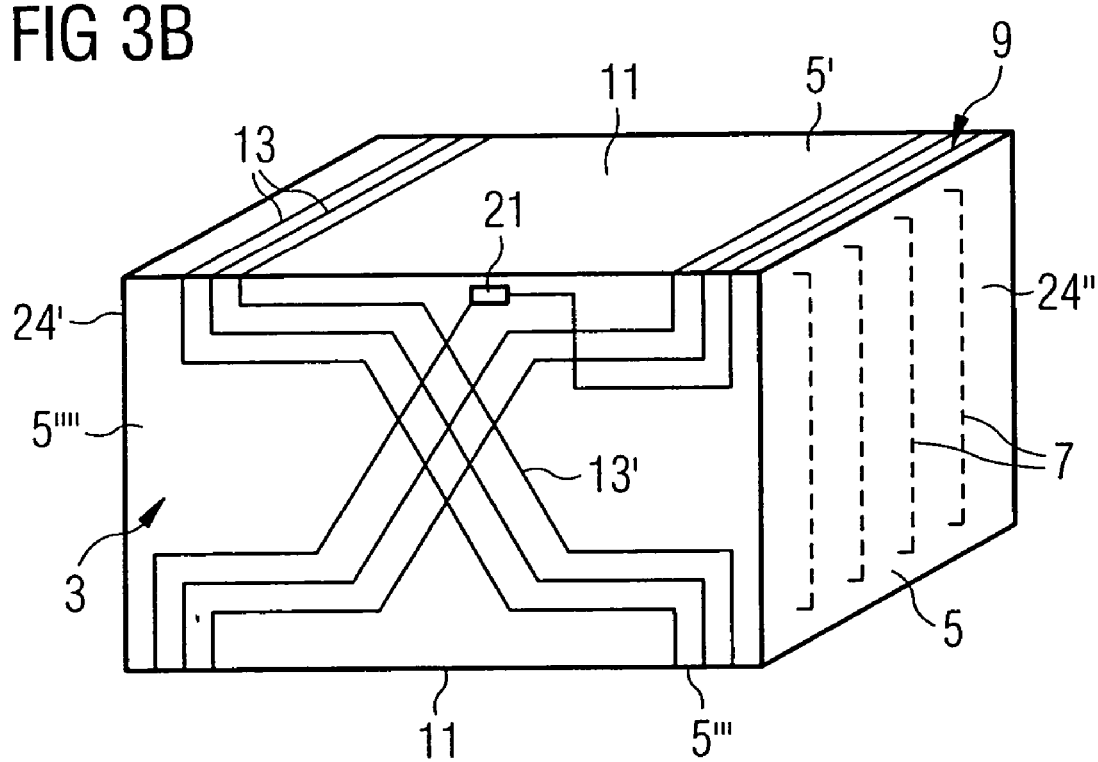
Figure 3C:
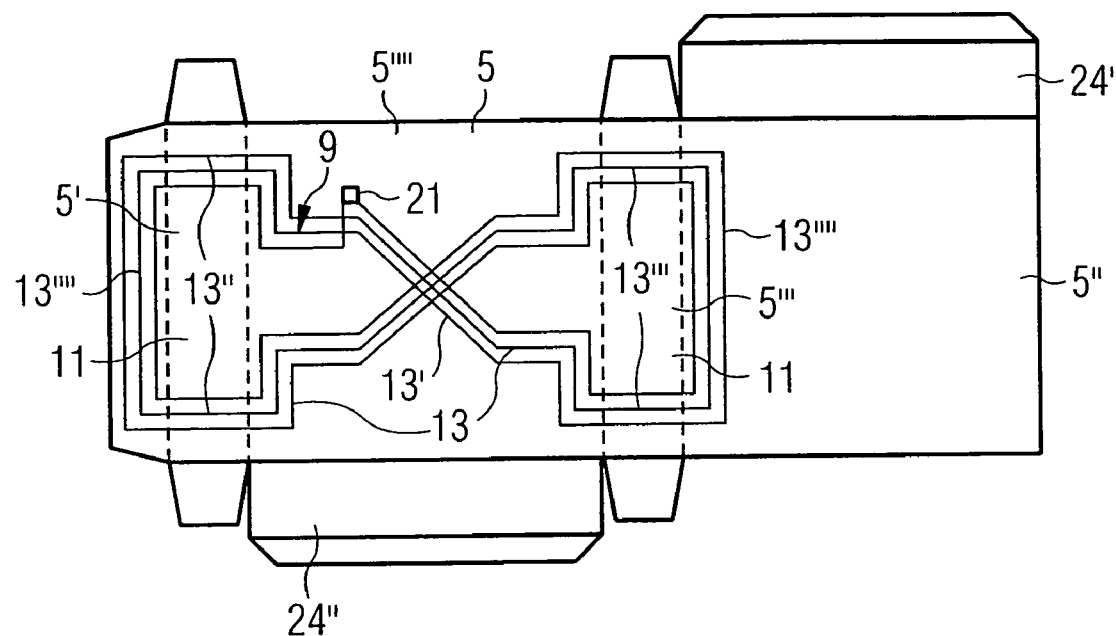
FIG. 3C shows a plan view of the packaging shown in FIGS. 3A and 3B in an intermediate state during its production.

FIGS. 3A and 3B show perspective views, from the front and from the rear, of an identifiable packaging 3 of a third embodiment. This packaging 3 can be used in an identification system as described with reference to FIG. 1. In this embodiment, the packaging has a cardboard parallelepipedal packaging body 5 with stacked plate-shaped products 7 accommodated in the packaging body 5. FIG. 3C shows the packaging body 5 in a folded-open state, which thus shows an intermediate state during the production of the packaging body 5.

The packaging 3 also has a transponder antenna 9 having a plurality of coil windings 13, which are arranged on the outer surface of the packaging body 5 such that they in each case surround a coil through-opening surface 11 on the upper side surface 5' and on the lower side surface 5''' of the packaging body 5. The coil through-opening surfaces 11 run parallel to the upper side surface 5' and parallel to the lower side surface 5''' of the packaging body 5 and in these side surfaces 5', 5'''. The first and the second coil through-opening surfaces 11 run essentially parallel to the stacking direction SR and thus essentially perpendicularly to the plate surface of the products 7 stacked in the packaging body 5.

As can be seen in the rear views of the packaging 3 shown in FIGS. 3B and 3C, the coil windings 13 are arranged with a figure eight-loop shape with coil winding sections which intersect one another on the rear side surface 5"" of the packaging body 5. The transponder antenna 9 has a rectangular C shape when viewed in the direction perpendicular to the stacking direction SR. The transponder antenna 9 has a C base section 13', which is arranged on the rear side surface 5"" of the packaging body 5, a C limb section 13", which is arranged on the upper side surface 5', and a C limb section 13''', which is arranged on the lower side surface 5'''. The transponder antenna 9 also has, in each case, one termination section 13"" at the free ends of the C limb sections 13", 13'''. The termination sections 13"" are bent back at right angles towards one another, starting from the C limb sections 13', 13'''.

The C base section 13', the C limb sections 13", 13''' and the termination sections 13"" each extend flat with coil windings 13, running parallel next to one another, on the associated side surfaces. The front and the rear side surfaces 5" and 5"" of the packaging body have large dimensions compared to the remaining side surfaces, i.e. the upper 5', lower 5''', left-hand 24' and right-hand 24" side surfaces. None of the coil windings 13 of the termination sections 13"" extends on the adjacent upper or lower side surface 5', 5'''. The coil windings 13 of the termination sections 13"" instead extend adjacent and parallel to the respective edge between the front side surface 5" and the upper or the lower side surface 5', 5'''.

On the rear side surface 5"", the coil windings 13 extend a further small distance parallel to the respective edge between the rear side surface 5"" and the upper side surface 5' or the lower side surface 5''' such that the coil through-openings 11, when viewed in the plan view or the view from below of the packaging 3, have an essentially enclosed rectangular shape.

When producing the packaging 3, a blank of the packaging body is produced from cardboard, as shown in FIG. 3C. The correspondingly shaped transponder antenna 9 is fitted to the blank, for example by means of adhesive bonding. The transponder antenna 9 may be, for example, provided in the form of a film. When folding the blank to form the packaging body 3, the transponder antenna 9 is also folded automatically and obtains the C-shaped structure described above.

During operation of the packaging 3 in accordance with the third embodiment, both the coil through-opening surface 11, which is provided on the upper side surface 5' of the packaging body 5, and the coil through-opening surface 11, which is provided on the lower side surface of the packaging body 5, can be permeated by the magnetic flux. As a result, a signal current can be produced which is correspondingly twice as high. Even if one of the two coil through-opening surfaces 11 is covered by, for example, an adjacent packaging 3, the other, uncovered coil through-opening surface 11 is sufficient to induce a sufficient current given the magnetic flux passing through it.

A chip 21, which stores an identification code, is connected to the transponder antenna 9 and is also integrated in the film of the transponder antenna 9. The function of the chip 21 is the same as that explained in the embodiments shown in FIGS. 1 and 2.

In the above embodiments, the coil through-opening surface is oriented at an angle of less than 90° with respect to the stacking direction, for example, substantially parallel with respect to the stacking direction. At least some of the coil windings may extend along one or more packaging body surfaces, which run at an angle with respect to the coil through-opening surface. The coil through-opening surface is also permeated by the magnetic flux of an electromagnetic field, which is induced by an associated read device, at a corresponding angle of 90° minus the angle between the coil through-opening surface and the stacking direction, for example perpendicularly, with respect to the stacking direction. In addition, the magnetic flux thus also runs, in the region of the coil through-opening surface, at the corresponding angle equal to the angle between the coil through-opening surface and the stacking direction, for example parallel, with respect to the orientation of the plate surfaces of the products. As a result, any metal components in the plates produce less disruptive eddy currents the more approximately parallel the magnetic flux runs with respect to the plates. If the coil through-opening surface runs at an angle of 0°, i.e. parallel, with respect to the stacking direction, the magnetic flux running through the coil through-opening surface likewise runs essentially parallel to the plates. Accordingly, virtually no eddy currents with a negative influence on the operation of the transponder antenna and thus the transponder are produced by the plate-shaped products.

Not all of the coil windings are located in the same plane as the coil through-opening surface. At least some of the coil windings run on one or more packaging surfaces, which run at an angle with respect to the coil through-opening surface. This increases the area of the coil through-opening surface so that a sufficiently large coil surface is permeated by the magnetic flux and ensures a sufficient level of energy and signal transmission for identification. If some of the coil windings do not extend in the coil through-opening surface, the overall coil structure has a bent-back shape. Thus, some of the coil windings run in the plane of the coil through-opening surface, and the other coil windings run along the other packaging surface(s) folded or bent back through the corresponding angle thereto. In one example, all of the coil windings are out of the plane defined by the coil through-opening surface but run around the coil through-opening surface. The coil windings in this case are wound transversely around the packaging body in an annular fashion, and the opening is defined by the annular shape forming the coil through-opening surface, which runs perpendicular to the stacking direction.

Although the coil windings can be integrated on the inside of the packaging body or in the wall of the packaging body, the coil windings may be arranged on the outer surface of the packaging body. In this case, the packaging body may be provided with an adhesive at points at which the transponder antenna is to be provided. The coil windings are then wound around the packaging body in the prescribed shape, whereupon they remain on the packaging as the adhesive cures. However, it is also possible for coils produced with the coil shape matched to the packaging body to be integrated into a self-adhesive film and for the corresponding packaging body then to subsequently be provided with this film, for example by it being laminated thereon. In this case, the transponder antenna may be applied to the flat packaging body blank of the packaging body during the production of the packaging body before the packaging body is folded, and then automatically folded at the same time as the packaging body.

Suitable packaging bodies may be essentially completely or partially hollow bodies, such as boxes and cases of any desired shape. Shapes may include parallelepipedal, round, or prism-shaped cases. Plate-shaped bodies that are matched so as to correspond to the hollow cross section of the body can be stacked. Thus, for example, triangular plates may be provided in a prismatic body, or corresponding circular plates may be provided in a round body. Metal-free material, such as plastic material or, for example, cardboard material, is provided as the material for the packaging body.

In the embodiments shown, the packaging body is a parallelepipedal body having two large parallelepiped surfaces lying opposite one another and, in comparison therewith, four small parallelepiped surfaces, the coil through-opening surface being provided parallel to one of the four small parallelepiped surfaces, at least some of the coil windings extending along at least one of the remaining parallelepiped surfaces. The parallelepipedal shape with two large parallelepiped surfaces makes it possible to arrange large plates or pallets that correspond to the dimensions of the large parallelepiped surfaces in the packaging body, for example for tablet products. In addition, the coil windings can easily be fitted to the flat parallelepiped side surfaces. In this case, some of the coil windings can simply be fitted flat on one small parallelepiped surface, in which case only the other coil windings are to be provided bent back on the one or more remaining parallelepiped surfaces.

In order to provide simple fitting, in this case, it is desirable for coil winding sections lying opposite one another to extend completely on one small parallelepiped surface, in which the coil through-opening surface is provided. One or both of the other opposing coil winding sections extend(s) on the correspondingly associated other of the remaining parallelepiped surfaces, for example on the respective large parallelepiped surface. This makes it possible to produce the transponder antenna in a simple manner such that it is flat and then to bend it back in the form of a U so as to correspond to the width, depth or length of the parallelepipedal body. In this case, the transponder antenna can be fitted flat onto the previous blank of the packaging body during the production of the packaging body and then be folded at the same time as this packaging body. Alternatively, the transponder antenna can be positioned on the manufactured packaging body on its corresponding small parallelepiped surface, in which case the limbs of the transponder antenna are then bent back and fitted to the opposing side surfaces of the parallelepiped, which are adjacent to the one small parallelepiped surface.

In the embodiment with coil windings wound transversely around the packaging body in combination with a parallelepipedal packaging body, the coil windings, for example, only run along the two large parallelepiped surfaces lying opposite one another and along two small parallelepiped surfaces lying opposite one another. As a result, a coil through-opening surface is achieved which extends perpendicularly with respect to the large parallelepiped surfaces. Thus, plate-shaped products that have a corresponding size to that of the cross-sectional area of the large parallelepiped surface can be stacked in the packaging. The products then run with their stacking direction parallel or with their plate surface perpendicular to the coil through-opening surface.

When flat (i.e. before the relevant coil windings have been bent back), the transponder antenna may have any desired annular shape. These annular shapes can include a circular or oval annular shape, or an undulating shape in a ring profile. The flat transponder antenna is likewise rectangular so as to correspond to the rectangular design of parallelepiped side surfaces in order to achieve a maximum coil through-opening surface.

Although only one coil through-opening surface is provided in the above embodiments, the coil can have two or more coil through-opening surfaces. If the coil has two coil through-opening surfaces, the surfaces may lie opposite one another and be aligned essentially flush with one another. The coil windings surrounding the coil through-opening surfaces in this case are connected to one another so as to form a coil structure having a figure eight shape. As a result, a larger coil through-opening surface is achieved and is produced as the sum of the two coil through-opening surfaces. In addition, improved identification reliability is achieved since, even if one coil through-opening surface is covered by, for example, an adjacently arranged package, the second coil through-opening surface can be permeated by the electromagnetic field emerging from the read device. The currents induced around the respective coil through-opening surface in the annular coil winding sections in the figure eight coil structure do not extinguish one another.

A combination of a packaging with plate-shaped products that are inserted into the packaging and are stacked in the stacking direction is also provided. In this case, the products have, for example, a metal component. The metal component may include a metal film extending parallel to the plate surface. The products may be health-related products, such as medicinal products. For example, tablet/pill products are provided which are inserted in plate-shaped pallets which have respective chambers on one side which are open towards the other plate side and in which the tablets or capsules are accommodated and which are provided on the other side with a metal film (e.g. an aluminum film) that seals the chambers and can be pressed in by hand.

An identification system having an identifiable packaging is also provided. The identification system may contain a packaging and products inserted therein and have a read device. In the read device, a radiofrequency signal for transmitting energy and signals can be transmitted to the transponder antenna and a code signal, which is transmitted by the transponder antenna and represents an identification code, can be received and evaluated using an evaluation device. In this case, a storage device storing the identification code, such as a microchip, is associated with the transponder antenna. The microchip is connected to the transponder antenna via data lines. The microchip may be activated by energy being transmitted to the transponder antenna in order to transmit the identification code in turn by means of the transponder antenna in the form of the code signal.

It is therefore intended that the foregoing detailed description be regarded as illustrative rather than limiting, and that it be understood that it is the following claims, including all equivalents, that are intended to define the spirit and scope of this invention. Nor is anything in the foregoing description intended to disavow scope of the invention as claimed or any equivalents thereof.

I claim:

1. An identifiable packaging comprising:
    a packaging body designed such that plate-shaped products can be stacked therein parallel to one another in a stacking direction; and
    a transponder antenna connected with the packaging body, the transponder antenna capable of transmitting energy and identification signals to identify the packaging, the transponder antenna having a coil with coil windings, the coil windings disposed along a coil through-opening surface and flat along the packaging body, the coil through-opening surface aligned at an angle of less than 90° with respect to the stacking direction, at least some of the coil windings that surround the coil through-opening surface extending along one or more packaging body surfaces disposed at an angle with respect to the coil through-opening surface.

2. The packaging of claim 1, wherein the coil windings are disposed on the outer surface of the packaging body.

3. The packaging of claim 1, wherein the packaging body has a parallelepipedal shape with two large side surfaces and tour small side surfaces, the coil through-opening surface parallel to one of the four small side surfaces, and at least some of the coil windings extend along at least one of the remaining side surfaces.

4. The packaging of claim 3, wherein the coil windings comprise rectangles with coil winding sections lying opposite one another in pairs, one set of two coil winding sections, lying opposite one another, disposed along one of the four small side surfaces, and the other two coil winding sections, lying opposite one another, running along the respective large side surface.

5. The packaging of claim 1, wherein the transponder antenna comprises two coil through-opening surfaces, which lie opposite one another and are aligned essentially flush with one another, the coil windings surrounding the coil through-opening surfaces being connected to one another so as to form a coil structure having a figure eight shape.

6. An identification system comprising:
    an identifiable packaging including:
        a packaging body designed such that plate-shaped products can be stacked therein parallel to one another in a stacking direction, and
        a transponder antenna connected with the packaging body, the transponder antenna capable of transmitting energy and identification signals to identify the packaging, the transponder antenna having a coil with coil windings, the coil windings disposed along a coil through-opening surface and flat along the packaging body, the coil through-opening surface aligned at an angle of less than 90° with respect to the stacking direction, at least some of the coil windings that surround the coil through-opening surface extending along one or more packaging body surfaces disposed at an angle with respect to the coil through-opening surface; and
    a read device, from which a radiofrequency signal can be transmitted to the transponder antenna and by which an identification code radiofrequency signal, transmitted by the transponder antenna, can be received and evaluated with identification of the packaging.

7. The system of claim 6, wherein the coil windings are disposed on the outer surface of the packaging body.

8. The system of claim 6, wherein the packaging body has a parallelepipedal shape with two large side surfaces and four small side surfaces, the coil through-opening surface parallel to one of the four small side surfaces, and at least some of the coil windings extend along at least one of the remaining side surfaces.

9. The system of claim 8, wherein the coil windings comprise rectangles with coil winding sections lying opposite one another in pairs, one set of two coil winding sections, lying opposite one another, disposed along one of the four small side surfaces, and the other two coil winding sections, lying opposite one another, running along the respective large side surface.

10. The system of claim 6, wherein the transponder antenna comprises two coil through-opening surfaces, which lie opposite one another and are aligned essentially flush with one another, the coil windings surrounding the coil through-opening surfaces being connected to one another so as to form a coil structure having a figure eight shape.

11. An identification system comprising:
   an identifiable packaging including:
      a packaging body designed such that plate-shaped products can be stacked therein parallel to one another in a stacking direction, the packaging body comprising a coil through-opening surface aligned at an angle of less than 90° with respect to the stacking direction, and
      means for transmitting energy and identification signals to identify the packaging.

12. The system of claim 11, further comprising means for transmitting a radiofrequency signal to a transponder antenna, for receiving and evaluating an identification code radiofrequency signal transmitted by the means for transmitting energy and identification signals.

13. The system of claim 11, wherein the packaging body has a parallelepipedal shape with two large side surfaces and four small side surfaces, the coil through-opening surface parallel to one of the four small side surfaces.

14. A method of identifying packaging, the method comprising:
   providing an identifiable packaging including:
      a packaging body containing plate-shaped products stacked parallel to one another in a stacking direction, and
      a transponder antenna connected with the packaging body, the transponder antenna having a coil with coil windings, the coil windings disposed along a coil through-opening surface and flat along the packaging body, the coil through-opening surface aligned at an angle of less than 90° with respect to the stacking direction, at least some of the coil windings that surround the coil through-opening surface extending along one or more packaging body surfaces disposed at an angle with respect to the coil through-opening surface; and
   transmitting energy and identification signals to identify the packaging using the transponder antenna.

15. The method of claim 14, wherein the coil windings are disposed on the outer surface of the packaging body.

16. The method of claim 14, wherein the packaging body has a parallelepipedal shape with two large side surfaces and four small side surfaces, the coil through-opening surface parallel to one of the four small side surfaces, and at least some of the coil windings extend along at least one of the remaining side surfaces.

17. The method of claim 16, wherein the coil windings comprise rectangles with coil winding sections lying opposite one another in pairs, one set of two coil winding sections, lying opposite one another, disposed along one of the four small side surfaces, and the other two coil winding sections, lying opposite one another, running along the respective large side surface.

18. The method of claim 14, wherein the transponder antenna comprises two coil through-opening surfaces, which lie opposite one another and are aligned essentially flush with one another, the coil windings surrounding the coil through-opening surfaces being connected to one another so as to form a coil structure having a figure eight shape.

19. A method of fabricating an identifiable packaging, the method comprising:
   providing a packaging body designed such that plate-shaped products can be stacked therein parallel to one another in a stacking direction; and
   providing a transponder antenna with the packaging body, the transponder antenna capable of transmitting energy and identification signals to identify the packaging, the transponder antenna having a coil with coil windings, the coil windings disposed along a coil through-opening surface and flat along the packaging body, the coil through-opening surface aligned at an angle of less than 90° with respect to the stacking direction, at least some of the coil windings that surround the coil through-opening surface extending along one or more packaging body surfaces disposed at an angle with respect to the coil through-opening surface.

20. The method of claim 19, wherein the coil windings are arranged on the outer surface of the packaging body.

21. The method of claim 20, further comprising providing the packaging body with an adhesive at points at which the transponder antenna is to be provided, winding the coil windings around the packaging body in a prescribed shape, and maintaining the coil windings on the packaging body as the adhesive cures.

22. The method of claim 20, further comprising laminating a self-adhesive film containing the coil integrated therein on a flat packaging body blank and folding the flat packaging body blank containing the self-adhesive film to form the packaging body.

23. The method of claim 14, wherein the transponder antenna comprises two coil through-opening surfaces, which lie opposite one another and are aligned essentially flush with one another, the coil windings surrounding the coil through-opening surfaces being connected to one another so as to form a coil structure having a figure eight shape.

* * * * *